United States Patent
Barski et al.

(10) Patent No.: US 9,947,129 B2
(45) Date of Patent: Apr. 17, 2018

(54) METHOD FOR ENHANCED DISPLAY OF IMAGE SLICES FROM 3-D VOLUME IMAGE

(71) Applicant: Carestream Health, Inc., Rochester, NY (US)

(72) Inventors: Lori L. Barski, Pittsford, NY (US); Mary E. Couwenhoven, Fairport, NY (US)

(73) Assignee: Carestream Health, Inc., Rochester, NY (US)

( * ) Notice: Subject to any disclaimer, the term of this patent is extended or adjusted under 35 U.S.C. 154(b) by 847 days.

(21) Appl. No.: 14/225,792

(22) Filed: Mar. 26, 2014

(65) Prior Publication Data

US 2015/0279059 A1    Oct. 1, 2015

(51) Int. Cl.
*G06T 11/00* (2006.01)
*G06T 15/20* (2011.01)
*G06T 19/20* (2011.01)
*G06T 5/00* (2006.01)

(52) U.S. Cl.
CPC ............ *G06T 15/205* (2013.01); *G06T 5/001* (2013.01); *G06T 11/008* (2013.01); *G06T 2210/41* (2013.01)

(58) Field of Classification Search
CPC . G06T 11/003; G06T 7/0012; G06T 2200/04; G06T 2207/10081; G06T 2207/10088; G06T 2207/20128; G06T 2207/30008; G06T 2210/41; G06T 7/0024; G06T 7/0083; G06T 11/60; G06T 15/08; G06T 15/205
See application file for complete search history.

(56) References Cited

U.S. PATENT DOCUMENTS

| 5,128,864 A * | 7/1992 | Waggener ............ G06T 11/006 378/14 |
| 5,270,926 A | 12/1993 | Tam |
| 5,999,587 A | 12/1999 | Ning et al. |

(Continued)

OTHER PUBLICATIONS

Shoji Hara et al., "Generalized dynamic range compression algorithm for visualization of chest CT images", Medical Imaging 2004: Visualization, Image-Guided Procedures and Display, Proceedings of SPIE vol. 5367, 2004, pp. 578-585.

(Continued)

*Primary Examiner* — Barry Drennan
*Assistant Examiner* — Jason Pringle-Parker (57) ABSTRACT

A method for rendering volume radiographic image content of a subject forms a volume image. The method extracts a first image slice from the volume image, then modifies the extracted first image slice by defining two or more spatial frequency bands from the image slice data and applying one or more viewer adjustments to the image slice data, wherein the one or more viewer adjustments condition the image data to enhance image content in at least one of the defined spatial frequency bands. A set of display rendering parameters is generated according to the two or more frequency bands and according to viewer adjustments made for the first image slice. A second image slice is extracted from the volume image. The generated set of display rendering parameters is applied to the second image slice to render an adjusted image slice and the adjusted image slice is displayed.

11 Claims, 7 Drawing Sheets

(56) References Cited

U.S. PATENT DOCUMENTS

| | | | |
|---|---|---|---|
| 7,266,229 B2 | 9/2007 | Couwenhoven et al. | |
| 7,356,173 B2* | 4/2008 | Wiemker | G06T 7/0012 |
| | | | 382/128 |
| 7,366,335 B2 | 4/2008 | Nagata et al. | |
| 7,848,560 B2 | 12/2010 | Wang et al. | |
| 8,832,019 B2* | 9/2014 | Gao | G06F 19/3437 |
| | | | 128/920 |
| 2005/0049494 A1* | 3/2005 | Gritzky | A61B 8/00 |
| | | | 600/437 |
| 2005/0228250 A1* | 10/2005 | Bitter | A61B 5/02007 |
| | | | 600/407 |
| 2007/0019851 A1* | 1/2007 | Nishide | G06T 11/005 |
| | | | 382/131 |
| 2009/0034684 A1* | 2/2009 | Bernard | G06T 19/00 |
| | | | 378/98 |
| 2013/0004041 A1* | 1/2013 | Yang | G06K 9/40 |
| | | | 382/131 |
| 2013/0243276 A1* | 9/2013 | Souza | G06T 7/0081 |
| | | | 382/128 |
| 2014/0148679 A1* | 5/2014 | Eary | A61B 5/4887 |
| | | | 600/407 |
| 2016/0042537 A1* | 2/2016 | Ng | G06T 11/005 |
| | | | 382/131 |

OTHER PUBLICATIONS

Alexandre X. Falcao et al., The Image foresting Transform: Theory, Algorithms, and Applications, IEEE Transactions on Pattern Analysis and Machine Intelligence, vol. 26, No. 1, Jan. 2004, pp. 19-29.

* cited by examiner

METHOD FOR ENHANCED DISPLAY OF IMAGE SLICES FROM 3-D VOLUME IMAGE

FIELD OF THE INVENTION

Embodiments described herein relate generally to radiation-based imaging and more particularly to methods and apparatus for rendering two dimensional (2-D) images from a three-dimensional (3-D) reconstructed image volume, such as from cone-beam computed tomography (CBCT) imaging.

BACKGROUND

Cone beam computed tomography (CBCT) or cone beam CT technology offers considerable promise for providing 3-D volume images. Cone beam CT systems capture volume data sets by using a high frame rate flat panel digital radiography (DR) detector and an x-ray source, typically affixed to a gantry that revolves about the object to be imaged, directing, from various points along its orbit around the subject, a divergent cone beam of x-rays toward the subject. The CBCT system captures projection images throughout the source-detector orbit, for example, with one 2-D projection image at every degree of rotation. The projections are then reconstructed into a 3-D volume image using various techniques. Among the most common methods for reconstructing the 3-D volume image are filtered back projection approaches.

Figure 1:
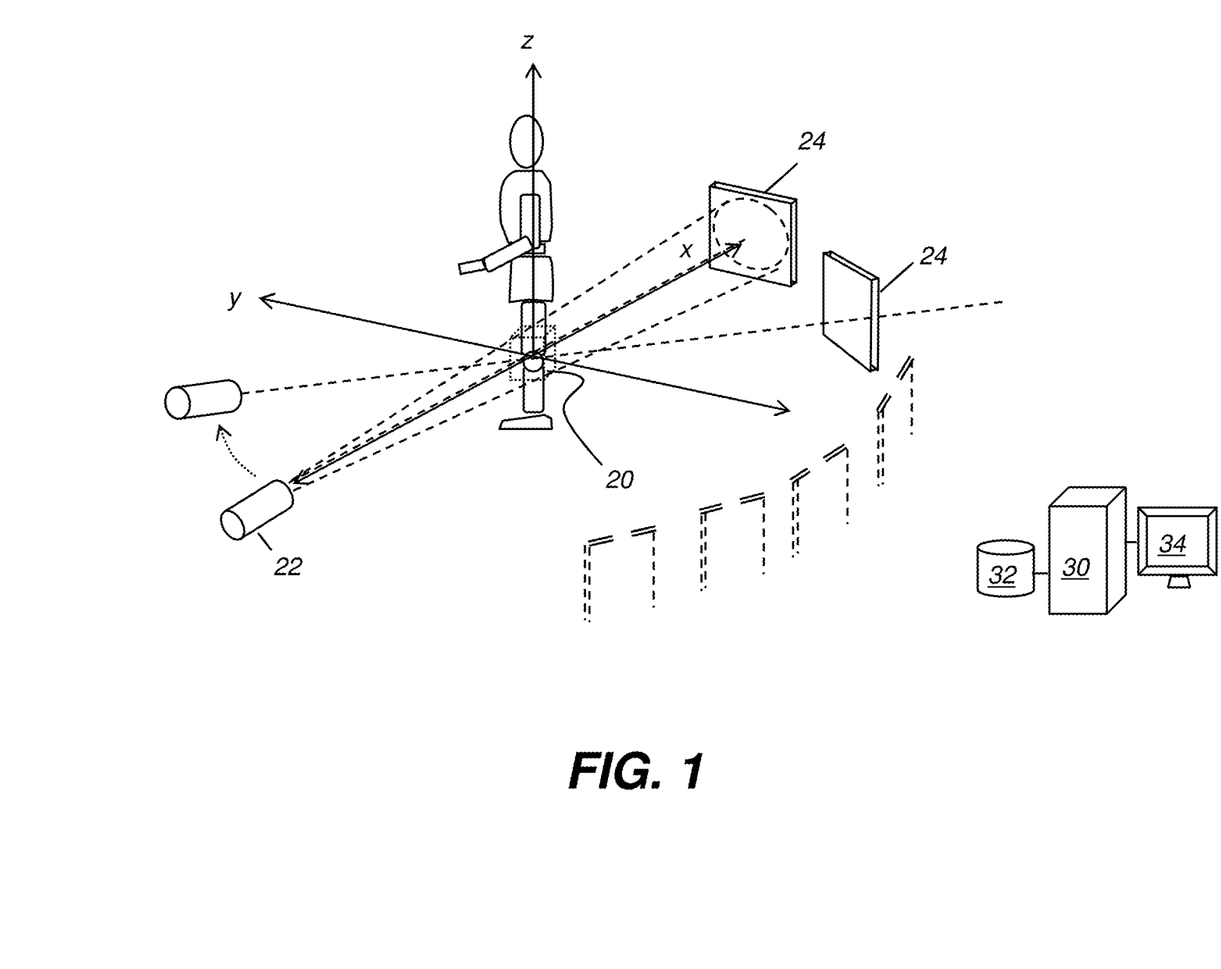
FIG. 1 is a schematic diagram showing components and architecture used for CBCT scanning.

Referring to the perspective view of FIG. 1, there is shown, in schematic form and using enlarged distances for clarity of description, the activity of a conventional CBCT imaging apparatus for obtaining the individual 2-D images that are used to form a 3-D volume image. A cone-beam radiation source 22 directs a cone of radiation toward a subject 20, such as a patient or other subject. A sequence of images is obtained in rapid succession at varying angles about the subject, such as one image at each 1-degree angle increment in a 200-degree orbit. A DR detector 24 is moved to different imaging positions about subject 20 in concert with corresponding movement of radiation source 22. FIG. 1 shows a representative sampling of DR detector 24 positions to illustrate how these images are obtained relative to the position of subject 20. Once the needed 2-D projection images are captured in this sequence, a suitable imaging algorithm, such as filtered back projection or other conventional reconstruction technique, is used for generating the 3-D volume image. Image acquisition and program execution are performed by a computer 30 or by a networked group of computers 30 that are in image data communication with DR detector 24. Image processing and storage is performed using a computer-accessible memory 32. The 3-D volume image can be presented on a display 34.

Although 3-D images of diagnostic quality can be generated using CBCT systems and technology, a number of technical challenges remain. A range of various types of tissue can be of interest to the viewing practitioner, for example. Bone and soft tissue have different characteristics for radiographic imaging and often show improved levels of detail under different processing conditions. Thus, for example, imaging filters that are optimized for bone imaging can perform poorly in providing diagnostically useful images of soft tissue. Similarly, imaging filters and processing that work well in showing image details in soft tissue may exhibit disappointing results if used for processing bone content.

Another difficulty with display of detail and obtaining good contrast, brightness, sharpness, and other characteristics relates to the inherent limitations of the human eye and of the display hardware. The image data itself can be 12-bit data, capable of representing 4,096 grayscale shades. The display hardware is much more limited and typically has an 8-bit grayscale range, capable of representing 256 shades of gray. The practitioner or other viewer, however, can differentiate no more than about 90 different shades of gray at best; some viewers are able to discern fewer than 50 different grayscale tones from each other.

Conventional display systems typically accommodate this disparity in grayscale mapping by providing a windowing adjustment for radiographic images. Windowing maps a partial portion of the larger image grayscale range to the smaller, limited dynamic range of the display hardware. Values above or below the mapped range are clipped. This means that the same brightness is assigned to all pixels having a value that exceeds the maximum brightness range; similarly, the same dark value is assigned to all pixels outside the range in the other direction. The practitioner or other viewer has a single brightness control that adjusts the window mapping toward one end of the image grayscale range or the other.

Many practitioners who are familiar with windowing accept its limitations and struggle with the available windowing adjustments to obtain the detail they need for diagnostic purposes. Adjustment of the window to one setting may provide good detail for bone and skeletal structures; however, image detail contrast for nearby soft tissue is degraded. Changing the window adjustment may improve the visibility of soft tissue detail but can then compromise bone contrast and detail. Windowing is thus often unsatisfactory where it is desirable to view both bone and soft tissue structure to a high level of detail in a reconstructed image.

To address this problem, commonly assigned U.S. Patent Application No. 2013/0004041 by Yang et al. proposes fusion of bone and soft tissue data from the 2-D projection images that were obtained using the process shown in FIG. 1, then generating a volume image resulting from this fusion. While this method has merit, however, there can be drawbacks to generating a single volume reconstruction using multiple sets of projection data. Processing time for generating the final "fused" 3-D volume reconstruction can increase significantly, without compensating improvements in the capability to adjust tone scale for image slice display. Improved techniques for enhancing the display of such fused data are still needed. Window level adjustment, although it offers some capability to change the appearance of some image features in local areas of the image, does not adequately address the need for enhancement of overall image content. For example, tone scale adjustment is not provided for the different features in the fused 3-D volume. Only windowing adjustment is provided for the displayed output, limiting the amount of adjustment available to the viewing practitioner.

Thus, it is seen that there would be value in an imaging approach that provides a high level of imaging detail for soft tissue as well as for bone or other anatomical features and that provides improved adjustments for the displayed image content.

SUMMARY

Embodiments of the present invention address the need for image enhancement for 2-D image slices obtained from 3-D volume image data.

According to an embodiment described in this disclosure, there is provided a method for rendering volume radiographic image content of a subject, the method executed at least in part on a computer and including forming a volume image by processing a plurality of 2-D projection images of the subject; extracting a first image slice from the volume image; modifying the extracted first image slice from the volume image by: (i) defining two or more spatial frequency bands from the first image slice data; (ii) applying one or more viewer adjustments to the first image slice data, wherein the one or more viewer adjustments condition the image data to enhance image content in at least one of the defined two or more spatial frequency bands; generating a set of one or more display rendering parameters according to the two or more frequency bands and according to viewer adjustments made to the first image slice; extracting a second image slice from the volume image; applying the generated set of display rendering parameters to the second image slice obtained from the volume image to render an adjusted image slice; and displaying the adjusted image slice.

According to an alternate aspect of the present invention, there is provided a method for rendering volume radiographic image content of a subject, the method executed at least in part on a computer and comprising a method for rendering volume radiographic image content of a subject, the method executed at least in part on a computer and including acquiring a plurality of 2-D projection images by scanning the subject over a range of different exposure angles; forming a first reconstructed image volume that enhances bone feature contrast, extracting a first 2-D image slice from the first reconstructed image volume, performing a frequency decomposition on the first 2-D image slice, and generating a first set of one or more display rendering parameters for rendering bone content of the first 2-D image slice according to one or more viewer adjustments; forming a second reconstructed image volume that enhances soft tissue feature contrast, extracting a second 2-D image slice from the second reconstructed image volume, performing a frequency decomposition on the second 2-D image slice, and generating a second set of one or more display rendering parameters for rendering soft tissue content of the second 2-D image slice according to the one or more viewer adjustments; and rendering and displaying the first and second image slices according to the generated first and second sets of display rendering parameters for bone or soft tissue content.

These objects are given only by way of illustrative example, and such objects may be exemplary of one or more embodiments of the invention. Other desirable objectives and advantages inherently achieved by the invention may occur or become apparent to those skilled in the art. The invention is defined by the appended claims.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

DETAILED DESCRIPTION OF THE EMBODIMENTS

The following is a detailed description of the preferred embodiments, reference being made to the drawings in which the same reference numerals identify the same elements of structure in each of the several figures.

Where they are used in the context of the present disclosure, the terms "first", "second", and so on, do not necessarily denote any ordinal, sequential, or priority relation, but are simply used to more clearly distinguish one step, element, or grouping of elements from another, unless specified otherwise. The term "set", as used herein, refers to a non-empty set, as the concept of a collection of elements or members of a set is widely understood in elementary mathematics.

In the context of the present disclosure, the term "volume image" is synonymous with the terms "3-Dimensional image" or "3-D image". An image slice or "2-D slice" is a 2-D image that has been extracted from the full 3-D volume. In the context of the present disclosure, the terms "viewer", "operator", "viewing practitioner", "observer", and "user" are considered to be equivalent and refer to the viewing practitioner or other person who views and may manipulate tone scale parameters of a radiographic image on a display monitor or other viewing apparatus. Viewer preferences relate to the particular viewer who observes a displayed image or image slice.

For the image processing steps described herein, the terms "pixels" for picture image data elements, conventionally used with respect 2-D imaging and image display, and "voxels" for volume image data elements, often used with respect to 3-D imaging, can be used interchangeably. It should be noted that the 3-D volume image is itself synthesized from image data obtained as pixels on a 2-D sensor array and can be displayed as a 2-D image from some angle of view. Thus, 2-D image processing and image analysis techniques can be applied to the 3-D volume image data. In the description that follows, techniques described as operating upon pixels may alternately be described as operating upon the 3-D voxel data that is stored and represented in the form of 2-D pixel data for display. In the same way, techniques that operate upon voxel data can also be described as operating upon pixels.

In the context of the present disclosure, the term "viewer adjustment" or, equivalently, "viewer parameter adjustment", is used to denote adjustment parameters made by a human observer that affect the appearance of a displayed image slice. Viewer adjustments include, but are not limited to, adjustments of brightness, detail contrast, sharpness, noise, latitude, and other parameters. Viewer adjustments can be made interactively, by viewer entry of parameters at the time the image slice is displayed, or can be applied automatically, such as from a set of pre-determined or stored parameters previously set up by an observer for later use. Viewer adjustments can be customized and indexed according to various factors, so that a particular stored set of viewer adjustments is selected based on viewer identity, such as by identifying which user is logged in to the computer system, for example. Viewer adjustments can alternately be assigned based on which type of image is displayed or based on patient factors such as patient size, age, sex, or weight. Default viewer adjustments can be stored and used for initial display of an image slice.

In the context of the present disclosure, rendering image data processes the data according to one or more parameters so that it can be displayed.

Embodiments of the present disclosure can be used with volume data from any of a number of sources, including computed tomography (CT), CBCT, digital tomosynthesis or other volume image modalities. Methods of the present disclosure generate volume data from a set of projection images. Image slices are extracted from the volume data and rendered with separate treatment for different types of bone and tissue content, using frequency decomposition and dynamic range compression. This provides enhanced detail and a tone scale with more appropriate dynamic range, while reducing clipping of the image that can commonly occur with conventional processing and windowing controls.

Attributes that govern the image quality of an x-ray image include brightness, dynamic range, detail contrast, edge sharpness, and noise. Various image processing methods and viewer adjustment settings enable these various attributes to be optimized for a particular image. However, as noted previously in the background section, conventional methods for image presentation do not provide sufficient capability to improve image quality beyond simple window control that globally adjusts the assignment of brightness values to corresponding image data values. Embodiments of the present disclosure provide methods for image enhancement of image slices obtained from a reconstructed volume image, such as from a CBCT or tomosynthesis imaging apparatus, wherein the enhancement that is provided is based, at least in part, on the type of anatomical features in the image.

According to an embodiment of the present disclosure, information is obtained about image and anatomical features in a reconstructed volume image and this information is used in order to enhance the reconstructed image data. Bone and soft tissue, for example, are identified and appropriate image conditioning applied for each type of content, to provide improved brightness, detail contrast, and other image characteristics. The reconstructed image data can be modified for display, so that slices obtained from the volume image are conditioned by the modified data according to processing and adjustments made as described herein. Advantageously, the volume image data itself is not changed, but the processing and adjustments are used to modify the rendering of any 2-D image slice that is viewed from the volume image content.

According to an embodiment of the present disclosure, the method generates two sets of volume data from the projection images using volume reconstruction techniques such as filtered back-projection (FBP) or Feldkamp-Davis-Kress (FDK) reconstruction: one set with enhanced bone content, with a predominance of high frequency image content, the other with enhanced tissue detail and relatively lower frequency image content. In one embodiment, the same corresponding slice is taken from each volume, the bone and tissue content identified, and a combined slice is rendered according to the identified bone and tissue content and operator-entered parameters for tone scale, detail contrast, brightness, latitude, sharpness, and noise. Frequency decomposition is applied to the bone content and tissue detail slices prior to combination and executes according to the segmentation results. Frequency related information is used for making appropriate image enhancement for rendering different features, such as for controlling image latitude, for example.

Image latitude is a measure of the extent to which the digital detector can be over- or under-exposed, while still providing an acceptable image. Dynamic range is a measure of the range of light intensities that the detector can capture simultaneously. Image latitude is related to dynamic range and indicates the relative sensitivity of the detector for image content in shadow or highlight areas.

In another embodiment of the present disclosure, the bone and soft tissue volumes are processed similarly using FBP, FDK, or other reconstruction method, to provide one volume image having enhanced bone content (high frequency), the other with enhanced tissue detail (low frequency). In one embodiment, the same corresponding slice is taken from each volume, the bone and tissue content identified, and a combined slice is rendered according to a weighted fusion of the identified bone and tissue content. Operator-entered parameters then set the tone scale, adjusting characteristics such as detail contrast, brightness, latitude, sharpness, and noise, in a manner superior to methods used with conventional windowing tools.

CBCT imaging apparatus, described previously with reference to FIG. 1, and the imaging algorithms used to obtain 3-D volume images using such systems are well known in the diagnostic imaging art and are, therefore, not described in detail in the present application. Some exemplary algorithms for forming 3-D volume images from the source 2-D projection images that are obtained in operation of the CBCT imaging apparatus can be found, for example, in U.S. Pat. No. 5,999,587 entitled "Method of and System for Cone-Beam Tomography Reconstruction" to Ning et al. and in U.S. Pat. No. 5,270,926 entitled "Method and Apparatus for Reconstructing a Three-Dimensional Computerized Tomography (CT) Image of an Object from Incomplete Cone Beam Data" to Tam.

In typical applications, as was shown in FIG. 1, a computer or other type of dedicated logic processor for obtaining, processing, and storing image data is part of the CBCT system, along with one or more displays for viewing image results. A computer-accessible memory is also provided, which may be a memory storage device used for longer term storage, such as a device using magnetic, optical, or other data storage media. In addition, the computer-accessible memory can comprise an electronic memory such as a random access memory (RAM) that is used for shorter term storage, such as employed to store a computer program having instructions for controlling one or more computers to practice the method according to the present invention.

Figure 2A:
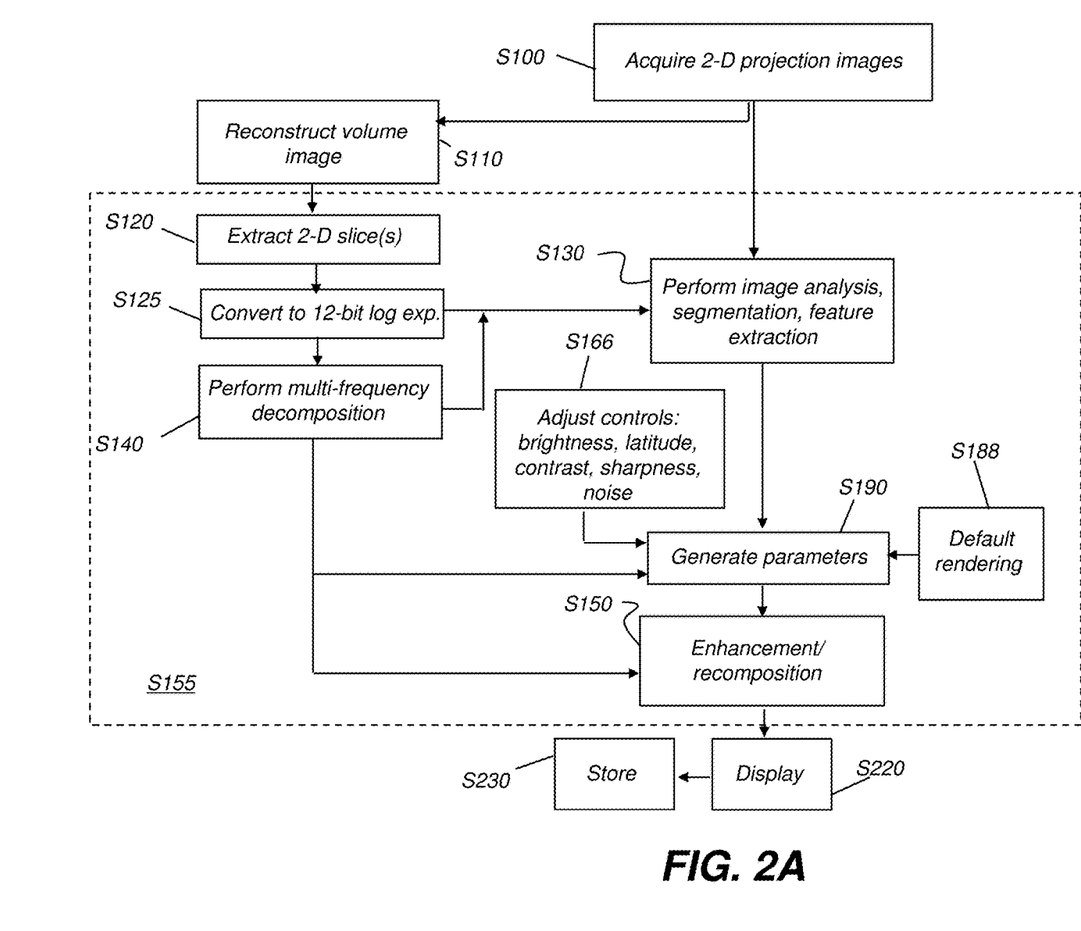
FIG. 2A is a logic flow diagram that shows steps in an image processing sequence for generating volume image data and displaying enhanced volume image content from a single volume reconstruction.

The logic flow diagram of FIG. 2A shows a sequence for processing and displaying enhanced volume image content for volume image data obtained using a CT scan apparatus or a cone-beam computerized tomography (CBCT) or tomosynthesis image acquisition apparatus, according to an embodiment of the present disclosure. In an image acquisition step S100, a set of 2-D projection images is acquired, using the scan sequence described previously with reference to FIG. 1. Alternately, for tomosynthesis imaging, the set of 2-D projection images also includes a scout image that is used for generating parameters used in subsequent rendering of the reconstructed image. The scout image can be obtained using different exposure settings from those used for other images in the set of 2-D projection images. In a reconstruction step S110, the acquired projection image data is used to generate a reconstructed 3-D volume image. This can be a standard reconstructed volume image formed from a set of 2-D projection images or may be an image generated from combined sets of 2-D projection image data, such as the fused image volume generated as described in commonly assigned U.S. Patent Application No. 2013/0004041 entitled "Methods and Apparatus for Texture Based Filter Fusion for CBCT System and Cone-beam Image Reconstruction" by Yang et al., incorporated herein by reference in its entirety.

Continuing with the FIG. 2A sequence, in an extraction step S120, one or more 2-D image slices from the reconstructed 3-D volume image are extracted. The slice data is converted to a log exposure representation in a conversion step S125. A feature analysis step S130 is executed on the extracted slice. Feature analysis step S130 performs processing functions that extract and identify image features (e.g. regions of direct exposure or unattenuated image signal on the detector) and anatomical features within the extracted image slice, such as bone, soft tissue, organs, connective tissues, features such as implants or other prostheses, casts, braces, or other support structures, and, optionally, performs segmentation of bone from soft tissue features, for example.

It is instructive to note that the 2-D image slice that is extracted in step S120 can be taken through the reconstructed image volume from any angle. For example, the extracted slice may be an axial, coronal, or sagittal slice, using standard conventions for defining these mutually orthogonal planes, or may be taken from an angle that is oblique to these conventional slice angles.

Methods for bone and tissue segmentation for volumetric image slices are known to those skilled in the imaging arts. An example of a technique that has been used for bone/tissue segmentation is described by Falcao, et al. in the article entitled "The Image Foresting Transformation: Theory, Algorithm, and Applications," in *IEEE Trans on Pattern Analysis and Machine Intelligence*, 26 (1): 19-29, 2004. In the image foresting transform (IFT) process, a multi-dimensional image can alternately be expressed as a set of nodes and arc-weights. This alternate type of data structure can help to facilitate straightforward, effective, and very fast (sub-linear) processing algorithms for processing substantial amounts of image data. In the context of the present disclose, the term "IFT" refers to a framework that represents the image data as a set of nodes and arcs-weights, also known as the image foresting transform.

Feature analysis step S130 can also perform segmentation of other types, such as to identify metal implants, to identify braces or other support structures separate from or external to the anatomy, or to identify particular anatomical regions of interest, for example.

A multi-frequency decomposition step S140 then decomposes the extracted slice content into a number of spatial frequency bands for subsequent processing. Results from steps S130 and S140 then go to a parameter generation step S190, along with interactively obtained viewer adjustment or default viewer adjustment settings from a viewer adjustment step S166. Control settings for step S166 are described in more detail subsequently. Parameter generation step S190 generates a set of display rendering parameters that can then be applied to any 2-D image slice that is extracted from the reconstructed image volume. Among advantages of this parameter set is improved consistency of image rendering. An enhancement and recomposition step S150 is then executed according to the generated parameters and to related image analysis. Enhancement and recomposition step S150 modifies display rendering based, in part, on the individual frequency bands of step S140 according to the display rendering parameters of step S190 and then recombines them to create the enhanced slice. The resulting enhanced slice image is displayed in a display step S220.

A slice processing sequence S155 is denoted within dashed outline in FIG. 2A. Slice processing sequence S155 indicates steps that can be repeated for each of multiple slices of the volume data for enhancing any image slice that is extracted or obtained from the reconstructed volume. Steps S120, S125, S130, and S140 can be repeated for one or more additional 2-D slices of the reconstructed volume, with the results used to provide further improvement in enhancement step S150. According to an embodiment of the present invention, multiple slices are extracted from the volume image for this processing, so that the full volume image can be more accurately enhanced for display than would be the case if using parameters derived from a few slices. For example, results from processing multiple image slices can be averaged or otherwise combined to provide an improved set of parameters. Transition between parameters used for different parts or views of the anatomy can be provided, so that variable brightness, contrast, noise filtering, or other processing is applied to the bone or soft tissue anatomy, depending on the view (coronal, axial, sagittal) or depending on variables such as depth within the volume, predominance of dense or soft tissue in a particular slice, and other factors.

As noted previously, initial presentation of the rendered image may use default rendering parameters S188, such as those obtained from a database. Different sets of default rendering parameters can be provided, such as a set of parameters that is appropriate for each different type of anatomy, for example. Parameter generation in parameter generation step S190 provides display rendering parameters for modifying the frequency bands that are then recomposed in step S150. Different sets of parameters can be generated for the different types of image tissue identified in feature analysis step S130. Display rendering parameters that are generated can alternately include filter parameters. Thus, for example, bone features are processed for rendering with a different set of parameters than those used for tissue features. The parameters that are generated in step S190 operate on the presentation of any selected slice of the reconstructed volume image that is generated from the original 2-D projection images. Parameter generation step S190 may generate one or more Look-Up Tables (LUTs), such as a first LUT for soft tissue content, a second LUT for bone content, for example. Thus, in data presentation, different portions of a single image slice may be rendered using two or more different LUTs, with the appropriate table selected for each pixel based on the segmentation results. Parameters can also be stored using other data structures, such as by storing filters or other variables. Adjustment data can also be varied depending on information from frequency decomposition.

It should be noted that in CT and CBCT imaging, the Hounsfield data values originally calculated may be preserved, allowing the viewing practitioner to access and view image attenuation data, such as by displaying Hounsfield values at any point in the image indicated by the position of a mouse cursor or other pointer. This capability can be provided using cascaded LUTs in an arrangement wherein the Hounsfield units value is mapped to log exposure space in a first LUT, then log exposure values are mapped to display space in a second LUT.

Methods for processing an image using multi-frequency decomposition are known to those skilled in the diagnostic digital imaging arts and are described, for example, in commonly assigned U.S. Pat. No. 7,266,229 entitled "Method for Rendering Digital Radiographic Images for Display Based on Independent Control of Fundamental Image Quality Parameters" to Couwenhoven et al. and commonly assigned U.S. Pat. No. 7,848,560 entitled "Control of Multiple Frequency Bands for Digital Image" to Wang et al., both incorporated herein by reference.

According to an embodiment of the present invention, the procedure in FIG. 2A obtains and modifies a displayed first image slice from the volume image by segmenting bone and soft tissue content in the first image slice data, defining two or more spatial frequency bands, such as non-overlapping spatial frequency bands, from the first image slice data, and applying one or more viewer adjustments to the first image slice data. The one or more viewer adjustments condition the image data to improve detail contrast for image content in each of the defined two or more spatial frequency bands. The method then generates a set of adjustment parameters according to the frequency bands and in accordance with viewer adjustments made for the first image slice. These adjustment parameters can then be used to modify any other image slice obtained from the reconstructed volume, as well as to enhance the reconstructed volume itself.

The processed image slice can display in a display step S220 and, optionally, can be stored in a data storage step S230. Parameters generated according to an embodiment of the present invention can be stored with the volume data or may be used to modify or condition the volume data as it is stored.

Figure 2B:
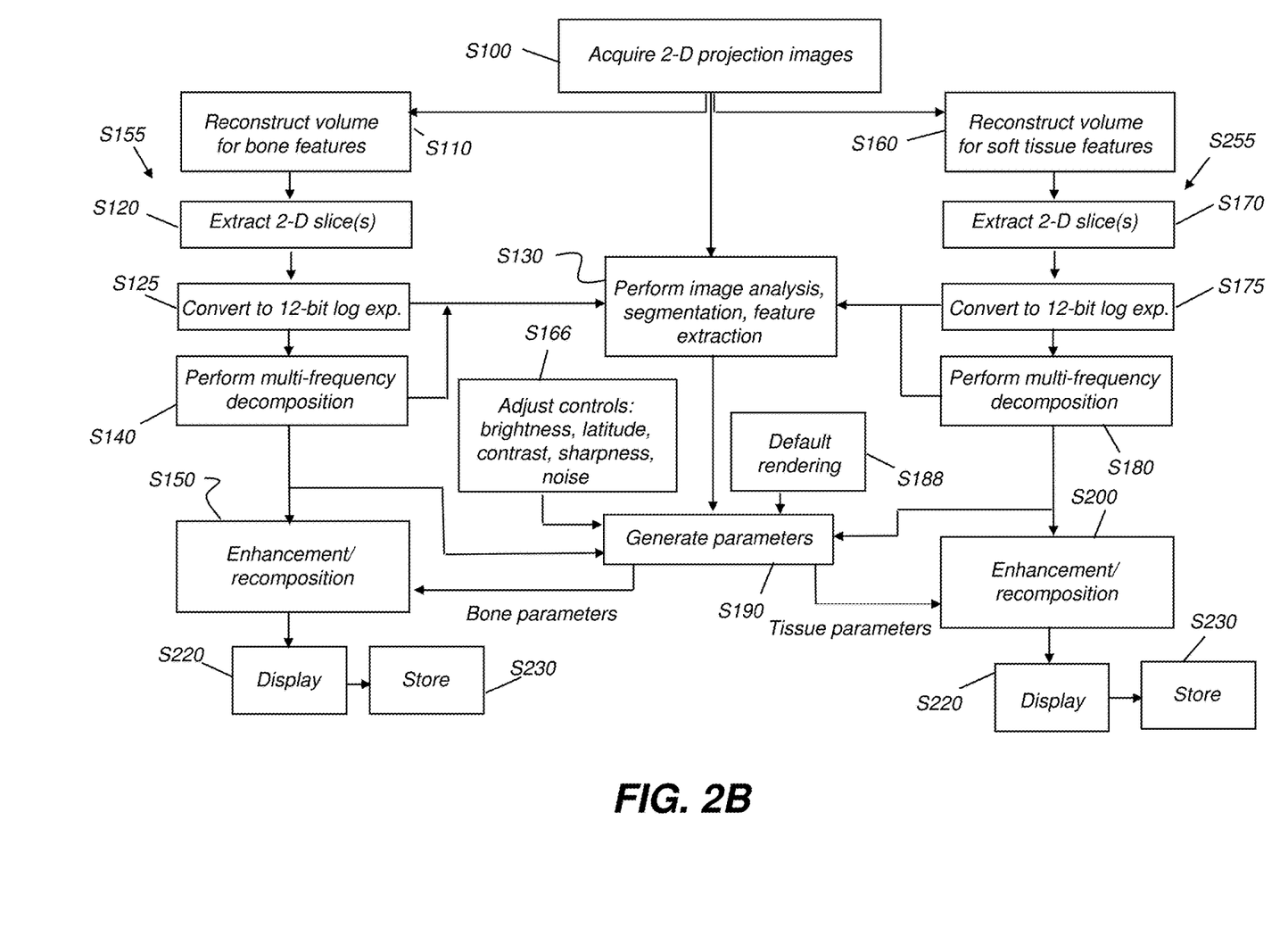
FIG. 2B is a logic flow diagram that shows steps in an image processing sequence for generating volume image data and displaying enhanced volume image content from two volume reconstructions.

The logic flow diagram of FIG. 2B shows an alternate sequence for displaying volume image content that provides enhanced detail contrast for a 3-D volume that contains both bone and soft tissue features. More generally, the logic flow shown in FIG. 2B can be applied for any two types of 3-D volume data that contain features that have different imaging characteristics and that may require different processing to show significant detail over the range of the display. Consistent rendering of the displayed output is provided using this sequence. Separate images display for bone and soft tissue content.

In image acquisition step S100 of FIG. 2B, a set of 2-D projection images is obtained, using the scan sequence described previously with respect to FIG. 1. One set of 2-D projection images is obtained, but two reconstructions are provided for this data. In reconstruction step S110, bone and other skeletal features are enhanced in reconstructing a volume image, using techniques for volume image reconstruction familiar to those skilled in the imaging arts. In a separate reconstruction step S160, soft tissue detail is enhanced.

The image reconstruction enhancement provided in steps S110 and S160 of FIG. 2B can be provided by different types of filtering, suited for bone and soft tissue, respectively. The reconstruction processing for bone generally deals with high-frequency image content, and may tend to have a higher number of image artifacts and a higher amount of noise. Reconstruction processing for soft tissue is more generally related to lower frequency image content and may be smoother and exhibit less noise. The output of steps S110 and S160 are two corresponding image volumes, of the same subject, but having different treatments, such as for bone and soft tissue, as shown.

Still continuing with the FIG. 2B sequence, slice extraction steps S120 and S170, respectively, extract corresponding 2-D slices from each of the two image volumes. The corresponding 2-D slices that are extracted contain the same image content, but this content can be given different treatment according to the processing in steps S110 and S160. The slices are converted to log exposure space in conversion steps S125 and S175. Segmentation of the image and anatomical features (e.g. bone and other features) in step S130 then provides the information on volume image content that is needed for subsequent processing.

For each image, steps in the sequence of FIG. 2B can be repeated multiple times for different slices, as described with reference to slice processing sequence S155 in FIG. 2A. For example, steps S120, S125, S130, S140, S166, S190, S188, S150, S220, and S230 can be executed repeatedly for individual slices of the reconstructed volume from step S110. Similarly, steps S170, S175, S180, S130, S166, S190, S188, S200, S220, and S230 can be executed repeatedly in a slice processing sequence S255 for individual slices of the reconstructed volume from step S160. Alternately, an appropriate subset of these steps can be used to generate an enhanced image volume that is then available for slice-by-slice rendering or storage. According to an embodiment of the present invention, multiple slices are extracted from the volume image for this processing, so that the full volume image can be more accurately enhanced for display than would be the case if using parameters derived from a few slices. For example, results from processing multiple image slices can be averaged or otherwise combined to provide an improved set of parameters. Transition between parameters used for different parts or views of the anatomy can be provided, so that variable brightness, detail contrast, noise filtering, or other processing is applied to the bone or soft tissue anatomy, depending on the view (coronal, axial, sagittal) or depending on variables such as depth within the volume, predominance of dense or soft tissue in a particular slice, and other factors.

Figure 2C:
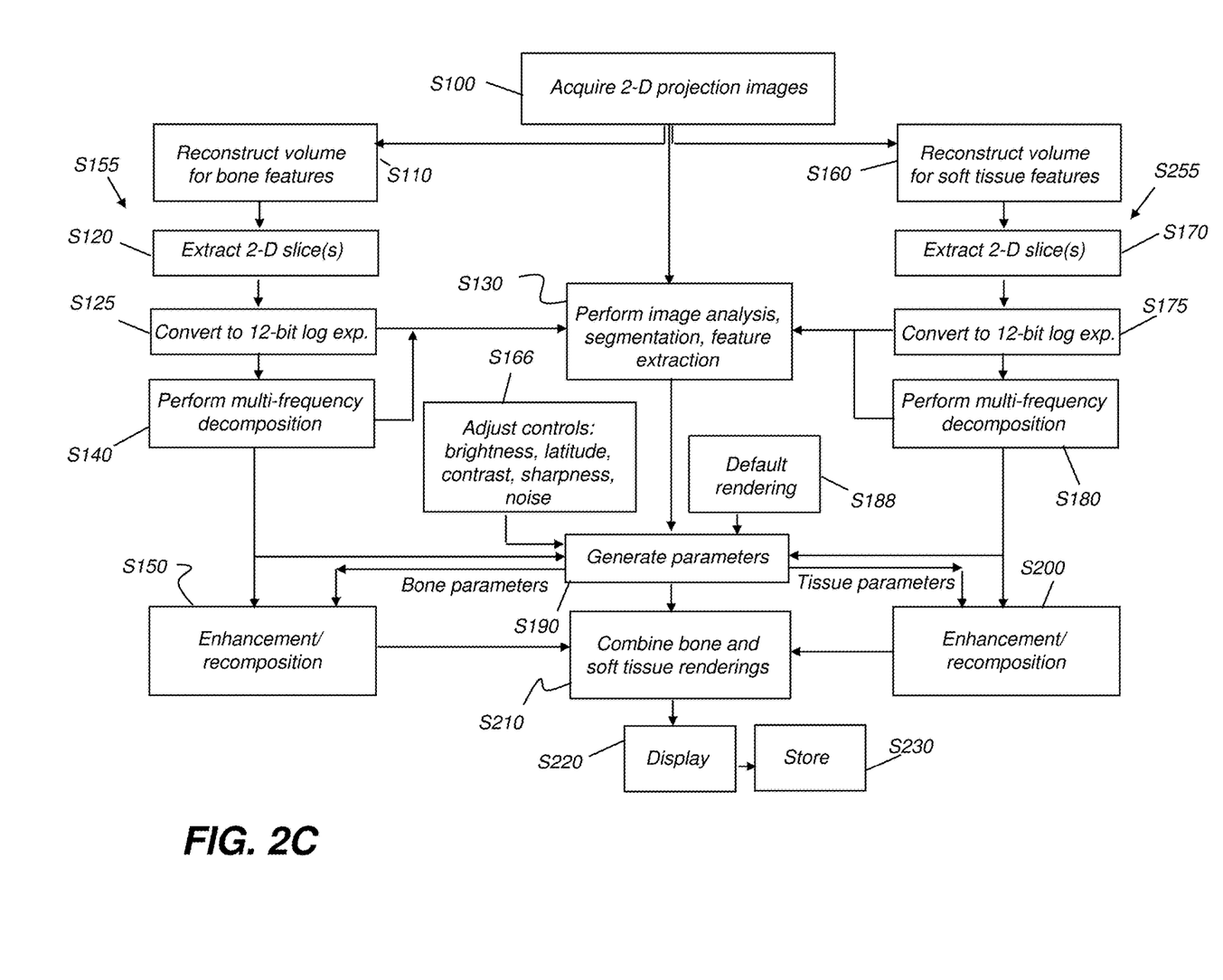
FIG. 2C is a logic flow diagram that shows steps in an image processing sequence for generating volume image data and displaying enhanced volume image content from a combined volume reconstruction.

For the sequence shown in FIGS. 2A-2C, additional information can be obtained from the original 2-D projection images that were acquired in step S100 and were used to generate the reconstructed volume image in step S110. This additional information can include existence and location of implants, prostheses, casts and other supports, and locations of full exposure or background areas. Parameter generation step S190 can take advantage of this additional information, such as to more accurately characterize image content for rendering, with parameters derived according to the features identified. This additional information can be helpful, for example, for locating an anatomical region of interest or for identifying structures or devices that are of little interest for image enhancement, such as braces or casts.

Multi-frequency decomposition steps S140 and S180 then decompose the respective 2-D image slices into a number of frequency bands, such as non-overlapping frequency bands, in preparation for subsequent processing that will enhance the image content of the corresponding image slices. For bone structures, for example, higher frequency content is enhanced. Enhancement of lower frequency content is more helpful for providing enhanced soft tissue detail. Feature analysis step S130 then performs processing functions that identify image features (e.g. regions of direct exposure, or regions of unattenuated image signal) and anatomical features within the extracted image slice, such as segmentation of bone from soft tissue features, for example. Adjustment step S166 then allows optional operator adjustment of image display parameters such as brightness, latitude, detail contrast, sharpness, noise, and other parameters. Image display parameters can be from interactively obtained viewer adjustments, also termed "operator-entered adjustments", or default viewer adjustment settings. Adjustment step S166 also provides values used to obtain consistent rendering for enhanced images that enhance different tissue or bone content. Adjustment step S166 results are then input to a parameter generation step S190 for generating bone and soft tissue rendering values used for enhancing image content from the two different volumes. The display rendering parameters can consist of adjustment parameters for constructing a tone scale look-up table (LUT) and modifying the frequency bands that are then recombined in step S150. Enhancement and recomposition step S150 then processes the extracted slice for bone content. An enhancement and recomposition step S200 then processes the extracted slice for soft tissue content. According to an embodiment of the present invention, the generated parameters can be applied to slices taken through the volume from any angle. Display steps 5220 allow the display of the adjusted bone or soft tissue image content.

The logic flow diagram of FIG. 2C shows an alternate sequence for displaying volume image content that provides enhanced detail contrast for a 3-D volume that contains both bone and soft tissue features. More generally, the logic flow shown in FIG. 2C can be applied for any two types of 3-D volume data for the same volume that contain features that have different imaging characteristics and that may require different processing to show significant detail over the range of the display. A single output image is displayed as a result of processing shown in FIG. 2C.

In image acquisition step S100, a set of 2-D projection images is obtained, using the scan sequence described previously with respect to FIG. 1. One set of 2-D projection images is obtained, but two reconstructions are provided for this data. In reconstruction step S110, bone and other skeletal features are enhanced in reconstructing a volume image, using techniques for volume image reconstruction familiar to those skilled in the imaging arts. In a separate reconstruction step S160, soft tissue detail is enhanced.

The image enhancement that is provided in steps S110 and S160 can be provided by different types of filtering, suited for bone and soft tissue, respectively. The reconstruction processing for bone generally deals with high-frequency image content, and may tend to have a higher number of image artifacts and a higher amount of noise. Reconstruction processing for soft tissue is more generally related to lower frequency image content and may be smoother and exhibit less noise. The output of steps S110 and S160 are two image volumes, of the same subject, but having different treatments, such as for bone and soft tissue, as shown.

Continuing with the FIG. 2C sequence, slice extraction steps S120 and S170, respectively, extract corresponding 2-D slices from each of the two image volumes. The corresponding 2-D slices that are extracted contain the same image content, but given different treatment according to the processing in steps S110 and S160. The slice data is converted to log exposure space in conversion steps S125 and S175.

Feature analysis step S130 then performs processing functions that identify image (e.g. regions of direct exposure, or unattenuated image signal) and anatomical features within the extracted image slice, such as segmentation of bone from soft tissue features, for example. Additional information is also obtained from the 2-D projection images originally used to form the image volume data, as described earlier.

Multi-frequency decomposition steps S140 and S180 then decompose the respective 2-D image slices into a number of spatial frequency bands in preparation for subsequent processing that will enhance the image content of the corresponding image slices. For bone structures, for example, higher frequency content is enhanced. Enhancement of lower frequency content is more helpful for providing enhanced soft tissue detail. An adjustment step S166 then allows optional operator adjustment of image display parameters such as brightness, latitude, detail contrast, sharpness, noise, and other parameters. Image display parameters can be from interactively obtained viewer adjustments or default viewer adjustment settings. Adjustment step S166 results are then input to parameter generation step S190 for generating display rendering parameter values used for enhancing image content from the two different volumes. Parameters include adjustment parameters for constructing a tone-scale look-up table (LUT) and modifying the frequency bands that are then recombined in step S150. Parameter generation step S190 can also generate weighting values for combination of bone and soft tissue content, for example. Enhancement and recomposition step S150 then processes the extracted slice for bone content. Another enhancement and recomposition step S200 then processes the extracted slice for soft tissue content.

Continuing with the FIG. 2C sequence, a combination step S210 is then executed. In combination step S210, the enhanced bone features from the corresponding 2-D slice that was obtained in step S120 are combined with the enhanced tissue features that were obtained as part of step S170. A display step S220 then displays the resulting combined image slice. Data storage step S230 can then store the processed image or image parameters or both for the combined renderings. Parameters generated according to an embodiment of the present invention can be stored with the volume data or may be used to modify the volume data as it is stored. According to an embodiment of the present disclosure, the volume data is stored as a set of axial slices; other organizational structures can optionally be used for storage.

For each image, steps in the sequence of FIG. 2C can be repeated multiple times for different slices, as described with reference to slice processing sequence S155 in FIG. 2A. For example, steps S120, S125, S130, S140, S166, S190, S188, S150, S210, S220, and S230 can be executed repeatedly for individual slices of the reconstructed volume from step S110. Similarly, steps S170, S175, S180, S130, S166, S190, S188, S200, S210, S220, and S230 can be executed repeatedly for individual slices of the reconstructed volume from step S160. Alternately, an appropriate subset of these steps can be used to generate an enhanced image volume that is then available for slice-by-slice rendering or storage. According to an embodiment of the present invention, multiple slices are extracted from the volume image for this processing, so that the full volume image can be more accurately enhanced for display than would be the case if using parameters derived from a few slices. For example, results from processing multiple image slices can be averaged or otherwise combined to provide an improved set of parameters. Transition between parameters used for different parts or views of the anatomy can be provided, so that variable brightness, detail contrast, noise filtering, or other processing is applied to the bone or soft tissue anatomy, depending on the view of a particular image slice (for example, coronal, axial, or sagittal view) or depending on variables for the slice, such as depth within the volume, predominance of dense or soft tissue in a particular slice, and other factors.

Figure 3:
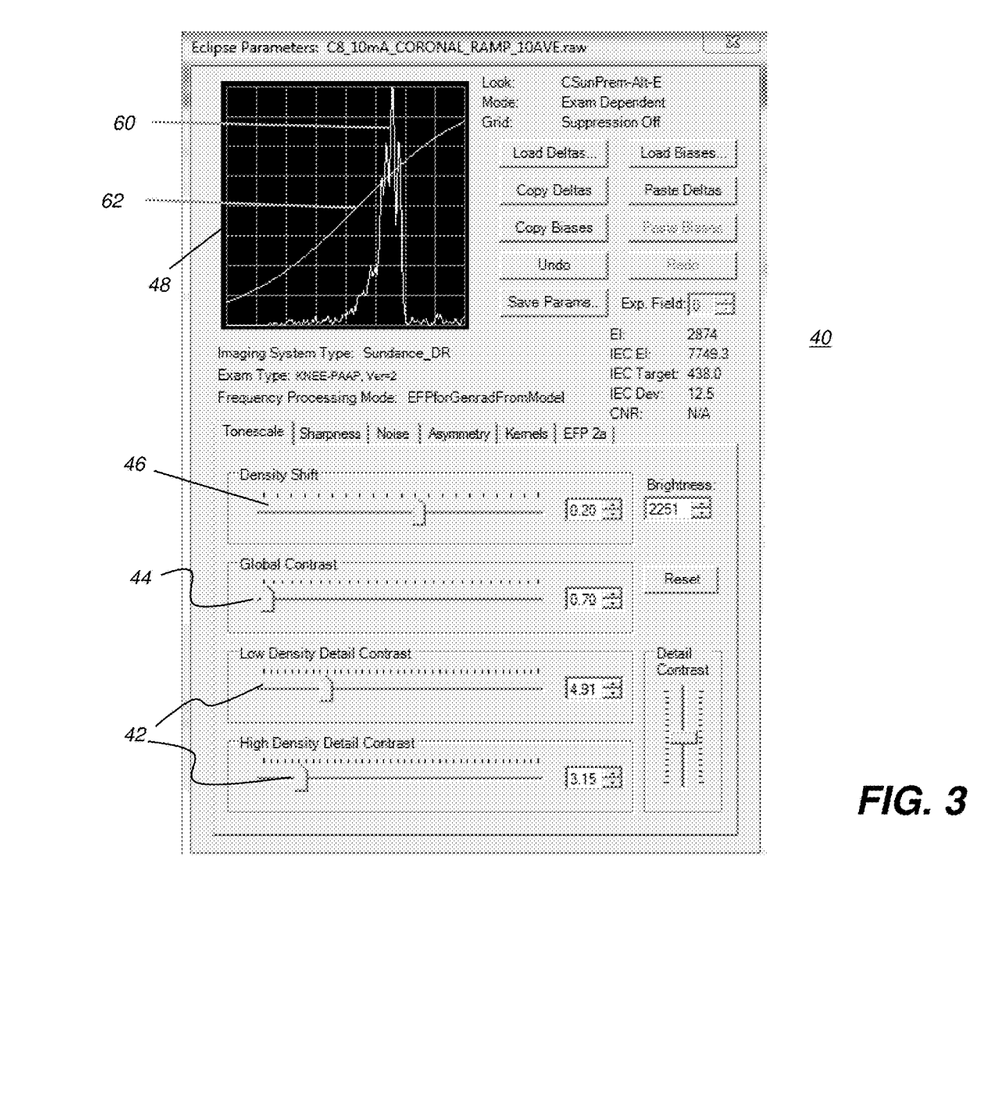
FIG. 3 shows an operator interface screen for control of 2-D slice image rendering.

As shown in FIG. 3, an operator interface window 40 enables changes to tone scale and other imaging parameters for the 2-D image slices in adjustment step S166 of FIGS. 2A-2C. A few exemplary controls for tone scale are shown. Brightness and global contrast control parameters affect the shape and position of the tone-scale LUT as shown in graph 48. This is a mapping of log exposure to optical density.

A graph 48 in FIG. 3 shows a curve 62 for the tone scale function, mapping optical density vs. exposure level (as log exposure) for the adjustments that are specified by the controls. The relative slope of curve 62 for the tone scale function determines the image contrast; a higher slope value increases contrast. Superimposed on graph 48 is a histogram 60 of image values.

A global contrast control 44 and a low density shift control 46 provide adjustment of the tone scale for image rendering. Global contrast control 44 controls the slope of curve 62. Density shift control 46 displaces the curve horizontally to adjust image response to the tone scale. Contrast controls 42 do not adjust the tone scale curve itself, but affect how low and high density image detail are rendered relative to the tone scale adjustments made with controls 44 and 46.

Figure 4A:
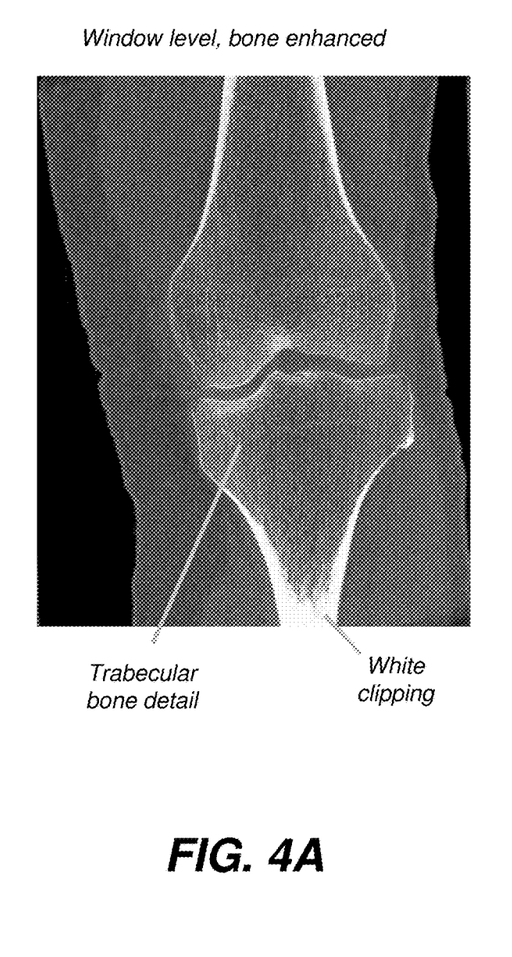
FIG. 4A shows a bone-enhanced image adjusted using conventional windowing utilities.
Figure 4B:
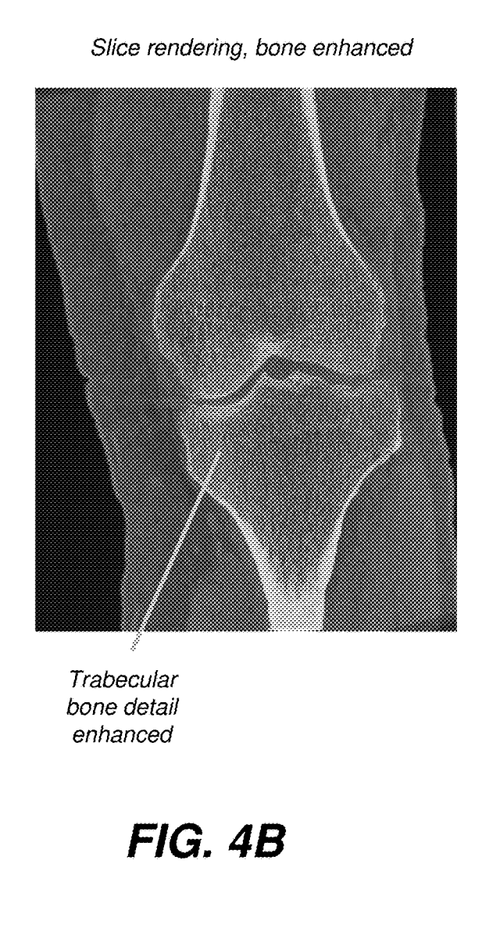
FIG. 4B shows a bone-enhanced image adjusted using the slice rendering methods of the present disclosure.

By way of comparison, FIG. 4A shows a bone enhanced image 50 that has been adjusted by a viewing practitioner using conventional window level controls. Image 50 shows some amount of clipping and a moderate amount of trabecular bone detail. FIG. 4B shows a bone enhanced image 52 with improved trabecular bone detail according to an embodiment of the present disclosure. Soft tissue also exhibits lower noise levels in the FIG. 4B rendering.

Figure 5A:
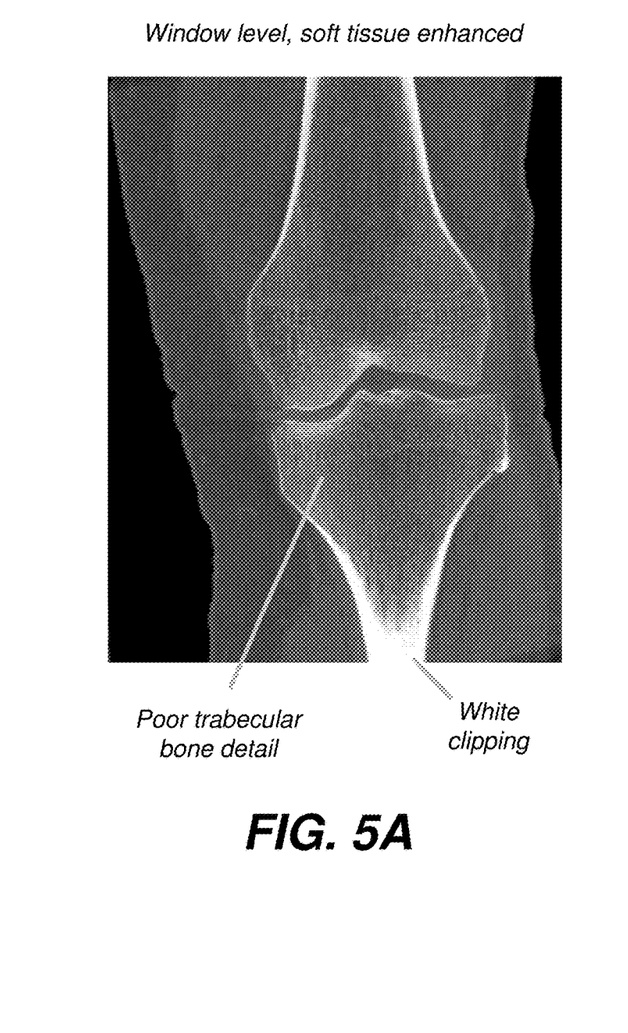
FIG. 5A shows a soft tissue-enhanced image adjusted using conventional windowing utilities.
Figure 5B:
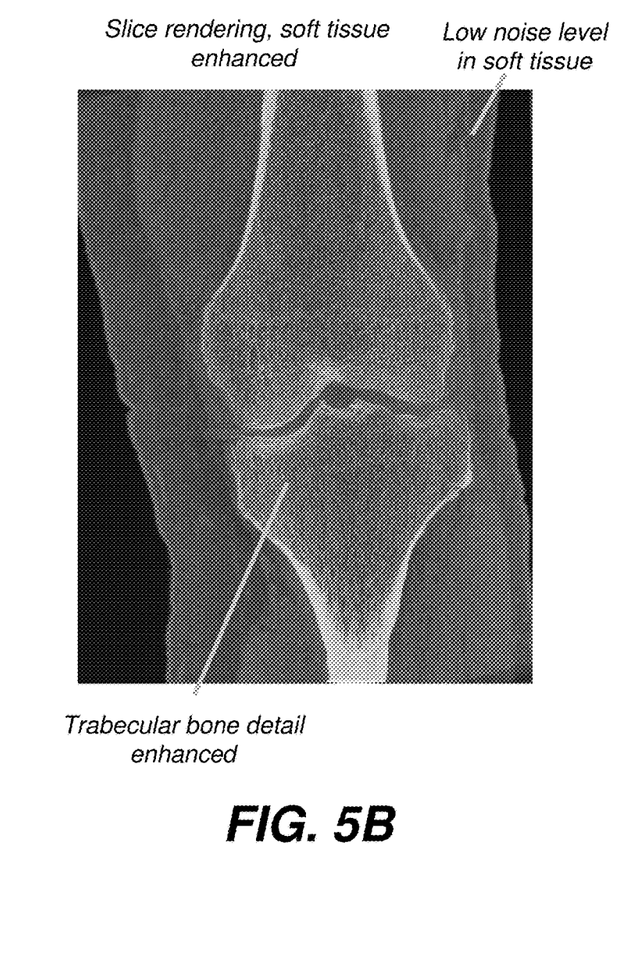
FIG. 5B shows a soft tissue-enhanced image adjusted using the slice rendering methods of the present disclosure.

FIG. 5A shows a soft tissue enhanced image 54 that has been adjusted by an operator using conventional window level controls. This image shows some amount of clipping and only a small amount of trabecular bone detail. FIG. 5B shows a soft tissue enhanced image 56 with improved trabecular bone detail according to an embodiment of the present disclosure. Soft tissue also exhibits lower noise levels in the FIG. 5B rendering.

It should be noted that the same steps shown in FIGS. 2A, 2B, and 2C can be applied for tomosynthesis imaging as well as for CBCT imaging. Where a scout image is provided, image data from the scout image can be analyzed and used to provide consistent rendering for image slices from the reconstructed volume.

Consistent with an embodiment of the present invention, a computer program utilizes stored instructions that perform on image data that is accessed from an electronic memory. As can be appreciated by those skilled in the image processing arts, a computer program of an embodiment of the present invention can be utilized by a suitable, general-purpose computer system, such as a personal computer or workstation. However, many other types of computer systems can be used to execute the computer program of the present invention, including an arrangement of networked processors, for example. The computer program for performing the method of the present invention may be stored in a computer readable storage medium. This medium may comprise, for example; magnetic storage media such as a magnetic disk such as a hard drive or removable device or magnetic tape; optical storage media such as an optical disc, optical tape, or machine readable optical encoding; solid state electronic storage devices such as random access memory (RAM), or read only memory (ROM); or any other physical device or medium employed to store a computer program. The computer program for performing the method of the present invention may also be stored on computer readable storage medium that is connected to the image processor by way of the internet or other network or communication medium. Those skilled in the art will further readily recognize that the equivalent of such a computer program product may also be constructed in hardware.

It should be noted that the term "memory", equivalent to "computer-accessible memory" in the context of the present disclosure, can refer to any type of temporary or more enduring data storage workspace used for storing and operating upon image data and accessible to a computer system, including a database, for example. The memory could be non-volatile, using, for example, a long-term storage medium such as magnetic or optical storage. Alternately, the memory could be of a more volatile nature, using an electronic circuit, such as random-access memory (RAM) that is used as a temporary buffer or workspace by a microprocessor or other control logic processor device. Display data, for example, is typically stored in a temporary storage buffer that is directly associated with a display device and is periodically refreshed as needed in order to provide displayed data. This temporary storage buffer is also considered to be a type of memory, as the term is used in the present disclosure. Memory is also used as the data workspace for executing and storing intermediate and final results of calculations and other processing. Computer-accessible memory can be volatile, non-volatile, or a hybrid combination of volatile and non-volatile types.

It will be understood that the computer program product of the present invention may make use of various image manipulation algorithms and processes that are well known. It will be further understood that the computer program product embodiment of the present invention may embody algorithms and processes not specifically shown or described herein that are useful for implementation. Such algorithms and processes may include conventional utilities that are within the ordinary skill of the image processing arts. Additional aspects of such algorithms and systems, and hardware and/or software for producing and otherwise processing the images or co-operating with the computer program product of the present invention, are not specifically shown or described herein and may be selected from such algorithms, systems, hardware, components and elements known in the art.

While the invention has been illustrated with respect to one or more implementations, alterations and/or modifications can be made to the illustrated examples without departing from the spirit and scope of the appended claims. In addition, while a particular feature of the invention can have been disclosed with respect to only one of several implementations, such feature can be combined with one or more other features of the other implementations as can be desired and advantageous for any given or particular function. The term "at least one of" is used to mean one or more of the listed items can be selected. The term "about" indicates that the value listed can be somewhat altered, as long as the alteration does not result in nonconformance of the process or structure to the illustrated embodiment. Finally, "exemplary" indicates the description is used as an example, rather than implying that it is an ideal. Other embodiments of the invention will be apparent to those skilled in the art from consideration of the specification and practice of the invention disclosed herein. It is intended that the specification and examples be considered as exemplary only, with a true scope and spirit of the invention being indicated by the following claims, and all changes that come within the meaning and range of equivalents thereof are intended to be embraced therein.

What is claimed is:

1. A method for rendering volume radiographic image content of a subject, the method executed at least in part on a computer and comprising:
   forming a volume image by processing a plurality of 2-D projection images of the subject, the volume image having Hounsfield values;
   extracting a first image slice from the volume image;
   modifying the extracted first image slice from the volume image by:
      (i) defining two or more spatial frequency bands from first image slice data; and
      (ii) applying one or more viewer adjustments to the first image slice data, wherein the one or more viewer adjustments condition the image data to enhance image content in at least one of the defined two or more spatial frequency bands;
   generating a set of one or more display rendering parameters according to the two or more frequency bands and according to viewer adjustments made to the first image slice;
   extracting a second image slice from the volume image, the second image slice having Hounsfield values;
   applying the generated set of display rendering parameters to the second image slice obtained from the volume image to render an adjusted image slice; and
   preserving the Hounsfield values of the second image slice by corresponding the Hounsfield values of the second image slice with the adjusted image slice;
   displaying, storing, or transmitting the adjusted image slice; and
   in response to a user request, displaying at least one of the preserved corresponding Hounsfield values.

2. The method of claim 1 further comprising displaying the first image slice using default viewer adjustment parameters.

3. The method of claim 1 wherein modifying the extracted first image slice further comprises segmenting bone and soft tissue content in the first image slice data.

4. The method of claim 1 wherein the one or more viewer adjustments change the tone scale, change image sharpness, or change image detail contrast.

5. The method of claim 1 wherein the two or more spatial frequency bands are non-overlapping.

6. The method of claim 1 further comprising displaying the extracted first and second image slices from the volume image.

7. The method of claim 1 further comprising:
   extracting and displaying a third image slice from the volume image;
   modifying the displayed third image slice from the volume image by applying one or more additional viewer adjustments to the third image slice data, wherein the one or more additional viewer adjustments condition the image data to enhance image detail contrast in at least one of the defined two or more spatial frequency bands; and
   recalculating at least one of the set of one or more display rendering parameters according to the two or more frequency bands and according to the one or more additional viewer adjustments made for the third image slice.

8. The method of claim 1 wherein the one or more viewer adjustments are obtained from a stored set of viewer adjustments.

9. The method of claim 1 wherein the one or more viewer adjustments are obtained from a viewer during display of the first image slice.

10. A method for rendering volume radiographic image content of a subject, the method executed at least in part on a computer and comprising:
    acquiring a plurality of 2-D projection images by scanning the subject over a range of different exposure angles;
    processing the 2-D projection images to form a first reconstructed bone volume having enhanced bone features and a second reconstructed soft tissue volume having enhanced soft tissue features, the first and second reconstructed volumes having Hounsfield values;
    extracting a first 2-D image slice from the first reconstructed bone volume and a corresponding second 2-D image slice from the second reconstructed soft tissue volume, the first and second 2-D images slices having Hounsfield values;
    generating rendering parameters for each of the extracted first and second 2-D image slices by performing frequency decomposition on the corresponding image slice, segmenting bone from soft tissue within the corresponding image slice, and obtaining one or more viewer adjustments related to image rendering;
    combining the first and second 2-D image slices to generate a combined 2-D image slice using weighted values from the generated rendering parameters;
    preserving the Hounsfield values of the first and second 2-D image slices by corresponding the Hounsfield values of the first and second 2-D image slices with the combined 2-D image slice;
    displaying, storing, or transmitting the combined 2-D image slice; and,
    in response to a user request, displaying at least one of the preserved, corresponding Hounsfield values.

11. The method of claim 10 further comprising:
    extracting a third 2-D slice from the first reconstructed bone volume and a corresponding fourth 2-D image slice from the second reconstructed soft tissue volume;
    combining the third and fourth 2-D image slices to generate a second combined 2-D image slice using weighted values from the generated rendering parameters; and
    displaying, storing, or transmitting the second combined 2-D image slice.

* * * * *